(12) United States Patent
Fujii et al.

(10) Patent No.: US 10,030,179 B2
(45) Date of Patent: Jul. 24, 2018

(54) GRANULAR ADHESIVE AGENT

(71) Applicant: SUMITOMO CHEMICAL COMPANY, LIMITED, Chuo-ku, Tokyo (JP)

(72) Inventors: Syuji Fujii, Osaka (JP); Ryu Takeko, Osaka (JP); Yoshinobu Nakamura, Osaka (JP)

(73) Assignee: SUMITOMO CHEMICAL COMPANY, LIMITED, Tokyo (JP)

( * ) Notice: Subject to any disclaimer, the term of this patent is extended or adjusted under 35 U.S.C. 154(b) by 8 days.

(21) Appl. No.: 15/119,753

(22) PCT Filed: Feb. 23, 2015

(86) PCT No.: PCT/JP2015/056012
§ 371 (c)(1),
(2) Date: Aug. 18, 2016

(87) PCT Pub. No.: WO2015/129903
PCT Pub. Date: Sep. 3, 2015

(65) Prior Publication Data
US 2017/0051188 A1    Feb. 23, 2017

(30) Foreign Application Priority Data

Feb. 25, 2014  (JP) ................. 2014-033705

(51) Int. Cl.
| | |
|---|---|
| *B32B 5/16* | (2006.01) |
| *C09J 133/08* | (2006.01) |
| *C09J 7/00* | (2018.01) |
| *C09J 4/00* | (2006.01) |
| *C08J 3/12* | (2006.01) |
| *C09J 9/00* | (2006.01) |
| *C09J 11/04* | (2006.01) |
| *C08K 3/26* | (2006.01) |

(52) U.S. Cl.
CPC ............... *C09J 133/08* (2013.01); *C08J 3/12* (2013.01); *C09J 4/00* (2013.01); *C09J 7/00* (2013.01); *C09J 9/00* (2013.01); *C09J 11/04* (2013.01); *C08J 2333/08* (2013.01); *C08K 3/26* (2013.01); *C08K 2003/265* (2013.01); *C08K 2201/013* (2013.01); *C09J 2205/102* (2013.01); *C09J 2433/00* (2013.01)

(58) Field of Classification Search
None
See application file for complete search history.

(56) References Cited

U.S. PATENT DOCUMENTS

| | | | |
|---|---|---|---|
| 4,833,179 | A | 5/1989 | Young et al. |
| 5,322,731 | A | 6/1994 | Callahan, Jr. et al. |
| 6,716,527 | B1 | 4/2004 | Czmok et al. |
| 2015/0132567 | A1 | 5/2015 | Shimokuri et al. |

FOREIGN PATENT DOCUMENTS

| | | |
|---|---|---|
| EP | 2479229 A1 | 7/2012 |
| JP | 08-507567 A | 8/1996 |
| WO | 01/27188 A1 | 8/1917 |
| WO | 2013/175898 A1 | 8/1917 |
| WO | 94/20585 A1 | 9/1994 |

OTHER PUBLICATIONS

Communication dated Apr. 21, 2017, from the State Intellectual Property Office of People's Republic of China in counterpart Application No. 201580009267.X.
Communication dated Aug. 29, 2017 issued by the European Patent Office in counterpart application No. 15755152.4.
International Search Report for PCT/JP2015/056012 dated Jun. 2, 2015.
Pascale Aussillous et al.; "Properties of liquid marbles"; Proceedings of the Royal Society; A (2006) vol. 462,973-999; doi:10.1098/rspa.2005.1581; Jan. 17, 2006.
International Preliminary Report on Patentability dated Aug. 30, 2016 issued from the International Bureau in counterpart International Application PCT/JP2015/056012.
Yuekun Lai et al.; "Multi-functional hybrid protonated titanate nanobelts with turnable wettability"; Soft Matter, 2011, vol. 7, 6313-6319; Jun. 3, 2011; DO1:10.1039/clsm05412k; The Royal Society of Chemistry.

*Primary Examiner* — Robert T Butcher
(74) *Attorney, Agent, or Firm* — Sughrue Mion, PLLC

(57) ABSTRACT

There are provided a granular adhesive agent including a core portion and a shell portion, wherein the core portion including an adhesive composition and the shell portion is formed from solid particles, and a method for producing a granular adhesive agent. It is preferred that the solid particles include fine particles with a number average particle diameter of less than or equal to 500 μm as the main component. The granular adhesive agent according to the present invention is excellent in handling properties.

16 Claims, 1 Drawing Sheet

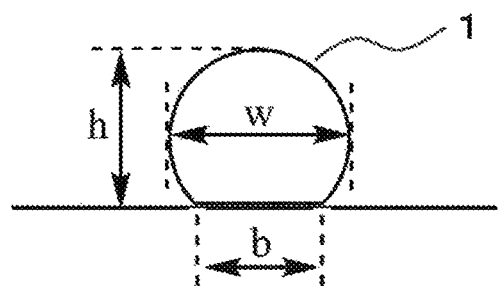

GRANULAR ADHESIVE AGENT

CROSS REFERENCE TO RELATED APPLICATIONS

This application is a National Stage of International Application No. PCT/JP2015/056012 filed Feb. 23, 2015, claiming priority based on Japanese Patent Application No. 2014-033705 filed Feb. 25, 2014, the contents of all of which are incorporated herein by reference in their entirety.

TECHNICAL FIELD

The present invention relates to a granular adhesive agent.

BACKGROUND ART

In general, adhesive agents are classified into a drying/solidification-type adhesive agent, a chemical reaction-type adhesive agent, a heat melting-type adhesive agent and a pressure sensitive-type adhesive agent depending on the solidification method. The drying/solidification-type adhesive agent is an adhesive agent cured by the vaporization of water or a solvent in the adhesive agent. The chemical reaction-type adhesive agent is an adhesive agent cured by the chemical reaction in a liquid compound. Examples of an adhesive agent of the chemical reaction-type adhesive agent include an adhesive agent cured by the reaction between a main agent and a curing agent, an adhesive agent cured by the reaction between a main agent and moisture (free water) on the surface of an adherend member, an adhesive agent cured by shutting off the air, an adhesive agent cured by being irradiated with ultraviolet rays, and the like. The heat melting-type adhesive agent is an adhesive agent which is in a solid state at ordinary temperature but is made into a liquid state by being applied with heat, then, allowed to solidify by being cooled, and is allowed to stick to an adherend member. The pressure sensitive-type adhesive agent is an adhesive agent which maintains the adhesive strength to an adherend by virtue of the tackiness of the adhesive agent.

PRIOR ART DOCUMENT

Non-Patent Document

Non-Patent Document 1: "PURO WO MEZASU HITO NO TAME NO SETTYAKU GIJYUTU KYOHON (Textbook of Adhesion Technique for People Aiming to be Professional)" edited by The Adhesion Society of Japan, published on June 2009, by Nikkan Kogyo Shimbun Ltd.

DISCLOSURE OF THE INVENTION

Problems to be Solved by the Invention

Since the drying/solidification-type adhesive agent and the chemical reaction-type adhesive agent are liquids, at the time of handling, these adhesive agents should not be allowed to come in contact with a person's skin. Although the heat melting-type adhesive agent is allowed to come in contact with a person's skin at the time of handling, the adhesive agent requires a heat source since heating is required at the time of adhesion, and furthermore, the adherend is required to have a heat resistance. Although the pressure sensitive-type adhesive agent is also allowed to come in contact with the skin at the time of handling, the adhesivity is lowered after once touched by a person's skin, and moreover, the adhesive agent requires a supporting base material when formed into a tape-like shape to be used. An adhesive agent which is excellent in handling and is different from such a conventional adhesive agent has been desired.

Means for Solving the Problems

The present invention includes the following configuration.

[1] A granular adhesive agent including a core portion and a shell portion, wherein the core portion comprises an adhesive composition and the shell portion is formed from solid particles.

[2] The granular adhesive agent according to [1], wherein the solid particles comprises hydrophobic fine particles.

[3] The granular adhesive agent according to [1] or [2], wherein the shell portion is formed from solid particles with a number average particle diameter of less than or equal to 500 μm.

[4] The granular adhesive agent according to any one of [1] to [3], wherein the shell portion is formed from solid particles comprising fine particles with a number average particle diameter of less than or equal to 500 μm as the main component.

[5] The granular adhesive agent according to any one of [1] to [4], wherein the contact angle of a droplet of the adhesive composition or a liquid droplet comprising the adhesive composition on the surface of agglomerated fine particles is greater than or equal to 900.

[6] The granular adhesive agent according to any one of [1] to [5], wherein the fine particles are fine particles having no adhesive force under an atmosphere of 30° C.

[7] The granular adhesive agent according to any one of [1] to [6], wherein the fine particles have a number average particle diameter of greater than or equal to 10 nm and less than or equal to 500 μm.

[8] The granular adhesive agent according to any one of [1] to [7], wherein the maximum width of the granular adhesive agent is greater than or equal to 100 μm and less than or equal to 50 mm.

[9] The granular adhesive agent according to any one of [1] to [8], wherein the volume of the adhesive composition is greater than or equal to 15 μL and less than or equal to 5 mL.

[10] The granular adhesive agent according to any one of [1] to [9], wherein the fine particles are fine particles of an inorganic substance.

[11] The granular adhesive agent according to any one of [1] to [9], wherein the fine particles are fine particles of an organic substance.

[12] The granular adhesive agent according to any one of [1] to [11], being dried.

[13] The granular adhesive agent according to any one of [1] to [13], wherein the adhesive force is developed by being applied with a stress.

[14] A method for producing a granular adhesive agent including the following steps (1) and (2) of;
(1) bringing a liquid droplet comprising an adhesive composition into contact with solid particles, and
(2) covering the whole outer surface of the liquid droplet comprising an adhesive composition with the solid particles.

[15] The method for producing a granular adhesive agent according to [14], further including the step (3) of; (3) drying the liquid droplet, the whole surface of which is covered with the solid particles, comprising an adhesive composition.

[16] The method for producing a granular adhesive agent according to [14] or [15], wherein the solid particles are composed mainly of fine particles with a number average particle diameter of less than or equal to 500 μm.

[17] A granular adhesive agent which allows the adhesive force to be developed by being applied with a stress, the granular adhesive agent having solid particles with an outer surface having no adhesive force.

[18] The granular adhesive agent according to [17], wherein fine particles included in the solid particles have a number average particle diameter of greater than or equal to 10 nm and less than or equal to 500 μm, and the maximum width of the granular adhesive agent is greater than or equal to 100 μm and less than or equal to 50 mm.

[19] A film which is formed by spreading out a granular adhesive agent according to any one of [1] to [13] on a plane and applying a stress to the granular adhesive agent.

[20] A coating film which is formed by curing a film according to [19].

Effect of the Invention

The granular adhesive agent according to the present invention is excellent in handling.

BRIEF DESCRIPTION OF THE DRAWING

FIG. 1 is a schematic view showing a granular adhesive agent according to the present invention.

MODE FOR CARRYING OUT THE INVENTION

The granular adhesive agent according to the present invention (hereinafter, sometimes referred to as the present adhesive agent) is an adhesive agent including a core portion comprising an adhesive composition and a shell portion formed from solid particles. Preferably, the solid particles include fine particles with a number average particle diameter of less than or equal to 500 μm as the main component. Preferably, the present adhesive agent is an adhesive agent which allows the shell portion to collapse by being applied with a stress and then allows the adhesive force to be developed.

Moreover, the present adhesive agent is an adhesive agent which has no adhesive force in a state of not being applied with a stress and allows the adhesive force to be developed by being applied with a stress, and is an adhesive agent having solid particles with an outer surface having no adhesive force. In the present description, the outer surface means the outermost surface of the core portion, namely, the critical surface exposed to the air, and is sometimes referred to simply as "the surface" in the present description.
<Core Portion, Adhesive Composition>

In the granular adhesive agent according to the present invention, the core portion is a portion constituted of an adhesive composition. Examples thereof include a droplet of the adhesive composition, a liquid droplet including the adhesive composition described below, a droplet prepared by removing part of water or a solvent included in the liquid droplet, or the like. Examples of the adhesive composition include a drying/solidification-type adhesive agent, a chemical reaction-type adhesive agent, a pressure sensitive-type adhesive agent, or the like. The adhesive composition may be the adhesive agent itself.

Drying/solidification-type adhesive agents are classified into a solvent-based adhesive agent, a water-based adhesive agent and an emulsion-based adhesive agent. The solvent-based adhesive agent is a type of an adhesive agent which allows a polymer to be dissolved in an organic solvent and allows the organic solvent to be evaporated to solidify. Examples of the polymer include chloroprene-based rubber, styrene/butadiene-based rubber, nitrile-based rubber, natural rubber, a vinyl chloride-based resin, a vinyl acetate-based resin, an acryl-based resin, a urethane-based resin, and the like.

Examples of the organic solvent include toluene, normal hexane, ethyl acetate, methyl ethyl ketone, acetone, methanol, tetrahydrofuran, xylene, cyclohexanone, and the like.

The water-based adhesive agent is a type of an adhesive agent which allows a water-soluble polymer to be dissolved in water and allows the water to be evaporated to solidify. Examples of the water-soluble polymer include natural macromolecules such as starch and glue, dextrin, a polyvinyl alcohol-based resin, a polyvinyl pyrrolidone-based resin, and the like. The water may be pure water, and may include impurities in an amount comparable to the amount thereof contained in tap water.

The emulsion-based adhesive agent is an adhesive agent which allows polymer particles stabilized by the action of an electrostatic stabilization effect or a steric stabilization effect to be dispersed in a dispersion medium, and is a type of an adhesive agent which allows the dispersion medium to be evaporated to solidify. Examples of a polymer constituting the polymer particle include a vinyl acetate-based resin, a (meth)acryl-based resin, a vinylidene chloride-based resin, an epoxy-based resin, a urethane-based resin, an olefin-based resin, a polyester-based resin, a natural rubber-based resin, a styrene/butadiene-based resin, a chloroprene-based resin, and the like. Examples of the dispersion medium include water and an organic solvent, and examples of the organic solvent include organic solvents that are the same as those described above.

The chemical reaction-type adhesive agent is an adhesive agent which allows one or more kinds of the adhesive component to undergo a chemical reaction by an external stimulation such as heat and light to solidify.

Examples of the chemical reaction-type adhesive agent include an epoxy-based adhesive agent containing an epoxy resin and a curing agent, a polyurethane-based adhesive agent containing polyisocyanate and a polyol, a urea resin-based adhesive agent containing urea and formaldehyde, a melamine resin-based adhesive agent containing melamine and formaldehyde, a phenol resin-based adhesive agent containing phenol and formaldehyde, and the like.

Moreover, a photocuring type epoxy-based adhesive agent, an acryl-based resin adhesive agent, an anaerobic type acryl-based adhesive agent, a two-pack curing type acryl-based adhesive agent called an SGA, a cyanoacrylate-based moisture-curing type adhesive agent, and the like are also exemplified as the chemical reaction-type adhesive agent. In the chemical reaction-type adhesive agent, as well as these adhesive agents, water or a solvent may be contained, and these adhesive agents may be dissolved in water or an organic solvent and may be dispersed therein. Examples of the organic solvent include organic solvents that are the same as those described above.

The pressure sensitive-type adhesive agent is an adhesive agent which allows the adhesive force to be developed by virtue of the tackiness of the adhesive agent, and in the pressure sensitive-type adhesive agent, a polymer such as a (meth)acryl-based resin, a rubber-based resin or a silicone-based resin is usually contained. In the pressure sensitive-type adhesive agent, as well as these adhesive agents, water or an organic solvent may be contained, and these adhesive agents may be dissolved in water or an organic solvent and may be dispersed therein. Examples of the organic solvent include organic solvents that are the same as those described above.

In the adhesive composition, other ingredients may be contained. Examples of other ingredients include metal fine particles, metal oxide fine particles, conductive fine particles, ionically conductive fine particles, an ionic compound having an organic cation or anion, a silane coupling agent, a crosslinking catalyst, a weather-resistant stabilizer, a tackifier, a plasticizer, a softening agent, a dye, a pigment, an inorganic filler, a resin other than the polymers, light diffusible fine particles such as organic beads, and the like.

The volume of the core portion constituted of an adhesive composition is preferably greater than or equal to 15 μL and less than or equal to 5 mL. The volume thereof is more preferably greater than or equal to 30 μL and further preferably greater than or equal to 50 μL. Moreover, the volume thereof is more preferably less than or equal to 3 mL and further preferably less than or equal to 2 mL.

<Shell Portion, Particles>

The shell portion in the present invention is a portion formed from solid particles, and is a portion covering the core portion. Preferably, the shell portion is a portion formed from an agglomerate of solid particles. The shell portion is preferably a portion covering the core portion without having a clearance of greater than or equal to 500 μm, is more preferably a portion covering the core portion without having a clearance of greater than or equal to 100 μm and is further preferably a portion covering the core portion without having a clearance of greater than or equal to 5 μm.

It is preferred that the shell portion in the present adhesive agent be formed from solid particles with a number average particle diameter of less than or equal to 500 μm, and it is more preferred that the solid particles forming the shell portion in the present adhesive agent include fine particles with a number average particle diameter of less than or equal to 500 μm as the main component. Moreover, the solid particles include the fine particles preferably in an amount of 50 to 100% by mass, more preferably in an amount of 70 to 100% by mass and further preferably in an amount of 90 to 100% by mass. For example, such a shell portion is obtained by a method of forming a shell portion from solid particles with a number average particle diameter of less than or equal to 500 μm, a method of forming a shell portion from solid particles composed mainly of fine particles with a number average particle diameter of less than or equal to 500 μm, or the like.

The contact angle of a droplet of the adhesive composition or a liquid droplet containing the adhesive composition on the surface of agglomerated fine particles is usually greater than or equal to 90°, preferably greater than or equal to 100°, more preferably greater than or equal to 110° and further preferably greater than or equal to 120°. Moreover, the contact angle therewith is preferably less than or equal to 170° and more preferably less than or equal to 160°. The granular adhesive agent having such a contact angle is preferred because the adsorption between solid particles forming the shell portion and a droplet of the adhesive composition or a liquid droplet containing the adhesive composition is facilitated, and moreover, the morphological stability of the present adhesive agent is enhanced.

The contact angle of a droplet of the adhesive composition or a liquid droplet containing the adhesive composition on the surface of agglomerated fine particles can be determined by uniformly spreading out fine particles with no clearance on a horizontal plane and then allowing a liquid droplet containing the adhesive composition to be quietly set down thereon to be measured using a contact angle meter. The contact angle refers to an angle that, when a tangential line is drawn from a junction of a fine particle portion, a droplet of the adhesive composition or the liquid droplet and the gas (air) to a curved surface of the droplet of the adhesive composition or the liquid droplet, this tangential line forms with the solid surface, and can be determined in accordance with JIS R 3257:1999. As the contact angle meter, a commercially available one can be used, and examples thereof include the product name "SImage 02" available from Excimer Inc.

The fine particles are fine particles having no adhesive force preferably at a temperature of 30° C. The fine particles are fine particles having no adhesive force more preferably at a temperature of lower than or equal to 40° C., further preferably at a temperature of lower than or equal to 50° C. and still further preferably at a temperature of lower than or equal to 80° C.

In the present description, having no adhesive force refers to having an adhesive force allowing the tack value to become less than or equal to 0.1 N when measured by a probe tack test under the following condition using a commercially available apparatus. The tack value refers to the maximum stress measured by the probe tack test under the following condition. Examples of the commercially available apparatus include the probe tack tester with a thermostatic chamber (product name "TE-6002") available from TESTER SANGYO CO., LTD., and the like.

<Measurement Conditions>

Probe tack tester: probe tack tester with a thermostatic chamber

Speed at the time of bringing a tackiness agent into contact with a probe: 10 mm/second Contact time: 30 seconds Releasing speed: 10 mm/second The glass transition temperature (Tg) of the fine particle is preferably higher than or equal to 40° C., more preferably higher than or equal to 50° C. and further preferably higher than or equal to 80° C.

When Tg is lower than the above lower limit, the granular adhesive agent is not preferred because the shell portion allows adhesive force to be developed by the change in the external environment and the adhesive agent sometimes becomes poor in handling.

The softening temperature of the fine particle is preferably higher than or equal to 40° C., more preferably higher than or equal to 50° C. and further preferably higher than or equal to 80° C.

When the softening temperature is lower than the above lower limit, the granular adhesive agent is not preferred because the shell portion allows adhesive force to be developed by the change in the external environment and the adhesive agent sometimes becomes poor in handling.

The decomposition temperature of the fine particle is preferably higher than or equal to 40° C., more preferably higher than or equal to 50° C. and further preferably higher than or equal to 80° C.

When the decomposition temperature is lower than the above lower limit, the granular adhesive agent is not preferred because the present adhesive agent allows adhesive force to be developed by the change in the external environment and the adhesive agent sometimes becomes poor in handling.

The number average particle diameter of fine particles is usually greater than or equal to 10 nm and less than or equal to 500 μm, preferably greater than or equal to 10 nm and less than or equal to 800 nm and more preferably greater than or equal to 20 nm and less than or equal to 500 nm. When the number average particle diameter of fine particles falls within the above-mentioned range, the granular adhesive agent is preferred because the stability thereof in the atmosphere is more enhanced.

The number average particle diameter is a particle diameter determined from the circle equivalent diameter calculated by a microscopic method, and can be measured by analyzing an image obtained by microscope observation with software in a digital microscope and the like. Examples of the software in a digital microscope include the product name "Motic Images Plus 2.2s" available from SHIMADZU RIKA CORPORATION. Examples of the microscope include an electron microscope, an optical microscope, or the like, but the microscope needs only to be appropriately selected according to the solid particles used. The magnification at the time of observation needs only to be appropriately selected according to the particle diameter of the solid particles used.

Preferably, the fine particles are fine particles of an inorganic substance or fine particles of an organic substance.

Examples of the fine particle of an inorganic substance include talc, clay, kaolin, silica, hydrotalcite, diatomaceous earth, magnesium carbonate, barium carbonate, calcium sulfate, calcium carbonate, magnesium sulfate, barium sulfate, barium titanate, aluminum hydroxide, magnesium hydroxide, calcium oxide, magnesium oxide, titanium oxide, zinc oxide, silicon oxide, alumina, mica, zeolite, glass, zirconia, calcium phosphate, metals (gold, silver, copper, iron), carbon materials (a carbon nanotube, fullerene, graphene, graphite), and the like. Moreover, the surface of these fine particles may be subjected to surface modification with a surface modifier such as a silane coupling agent, a surfactant, and the like.

Examples of the fine particles of an organic substance include fine particles of a resin, fine particles derived from natural products, and the like.

Examples of the component of the fine particle of a resin include a single polymer of styrene, a vinyl ketone, acrylonitrile, methyl methacrylate, ethyl methacrylate, glycidyl methacrylate, glycidyl acrylate, methyl (meth)acrylate, and the like or an interpolymer of two or more kinds thereof; a fluorine-based resin such as polytetrafluoroethylene, a tetrafluoroethylene-hexafluoropropylene copolymer, a tetrafluoroethylene-ethylene copolymer and polyvinylidene fluoride; a melamine resin; a urea resin; a polyethylene; a polypropylene; a polydimethylsiloxane-based macromolecule; a polyester; a polyamide, and the like. Moreover, the surface of these fine particles may be subjected to surface modification with a surface modifier such as a silane coupling agent, a surfactant, and the like. Two or more kinds of fine particles and two or more similar kinds of fine particles differing in particle size distribution may be mixed.

Tg of the resin can be adjusted by controlling the polymerization condition such as the monomer ratio and the like.

Examples of the fine particles derived from natural products include spores of a plant, pollen grains, fine particles derived from natural waxes, or the like. Moreover, the surface of these fine particles may be subjected to surface modification with a surface modifier such as a silane coupling agent, a surfactant, and the like.

It is preferred that the fine particles be fine particles with a hydrophobic surface. When the surface thereof is hydrophobic, there is a tendency that the whole surface of a liquid droplet described below is easily covered, and a granular adhesive agent can be easily prepared. By subjecting the surface of fine particles with a hydrophilic surface to a hydrophobization treatment, it is possible to make the surface of the fine particles hydrophobic.

As the fine particle, of the above-mentioned fine particles, silica, lycopodium, polytetrafluoroethylene and hydrophobization-treated calcium carbonate particles are preferred.

Such fine particles are commercially available. Examples of a commercial product thereof include silica particles (NIPPON AEROSIL CO., LTD., RY300), calcium carbonate particles (Shiraishi Kogyo Kaisha, Ltd., hydrophobization-treated particles), polytetrafluoroethylene (Sigma-Aldrich Japan Co., LLC.), and the like.

The thickness of the shell portion can be determined from the number average particle diameter of fine particles, and since there are a case where the shell portion partially allows fine particles to form a single layer and a case where the shell portion partially allows fine particles to form plural layers, causing variation in thickness, it is preferred that the average thickness thereof be determined. The average thickness of the shell portion is preferably less than or equal to 2 mm and more preferably greater than or equal to 100 nm and less than or equal to 500 μm. When the average thickness falls within the above-mentioned range, the granular adhesive agent is preferred because the morphological stability of the present adhesive agent is enhanced, and moreover, the shell portion can collapse by being applied with a moderate stress. In this context, allowing the shell portion to collapse refers to allowing an adhesive composition constituting the core portion to ooze out to the outside of the shell portion.

The average thickness of the shell portion can be measured by observation with an electron microscope (a transmission electron microscope, a scanning electron microscope). In the case where the size of a granule of the granular adhesive agent is too large, ultrathin slice samples can be prepared to measure the average thickness of the shell portion.

The maximum width of a granule of the present adhesive agent is preferably greater than or equal to 100 μm and less than or equal to 50 mm. The maximum width thereof is more preferably greater than or equal to 500 μm and further preferably greater than or equal to 1 mm. Moreover, the maximum width thereof is more preferably less than or equal to 30 mm, further preferably less than or equal to 20 mm and still further preferably less than or equal to 5 mm.

The volume of a granule of the present adhesive agent is preferably greater than or equal to 16 μL and less than or equal to 6 mL. The volume thereof is preferably greater than or equal to 40 μL and further preferably greater than or equal to 60 μL. Moreover, the volume thereof is more preferably less than or equal to 4 mL and further preferably less than or equal to 3 mL.

<Method for Producing Present Adhesive Agent>

The present adhesive agent can be produced by the following steps (1) to (3).

(1) The step of bringing a liquid droplet containing an adhesive composition into contact with solid particles, (2) the step of covering the whole surface of the liquid droplet containing an adhesive composition with the solid particles, and (3) the step of drying the liquid droplet, the whole surface of which is covered with the solid particles, containing an adhesive composition, arbitrarily.

As the solid particles, solid particles including fine particles with a number average particle diameter of less than or equal to 500 μm as the main component are preferred.

As the liquid droplet containing an adhesive composition, a droplet of the adhesive composition may be directly used, a droplet of a solution prepared by dissolving the adhesive composition in water or a solvent may be used, a droplet of a dispersion liquid prepared by dispersing the adhesive composition in water or a solvent may be used, and a droplet of a diluted solution prepared by diluting the adhesive composition with water or a solvent may be used.

As a liquid droplet of an adhesive composition containing a pressure sensitive-type adhesive agent, usually, a droplet of a solution or a dispersion liquid prepared by dissolving or dispersing the pressure sensitive-type adhesive agent in water or a solvent is used. Examples of the solvent include an organic solvent, and examples thereof include organic solvents that are the same as those described above.

The solid content of the liquid droplet containing an adhesive composition at the time of being brought into contact with solid particles is usually 5 to 100% by mass, preferably 10 to 80% by mass, more preferably 20 to 70% by mass and further preferably 40 to 60% by mass. When the solid content falls within the above-mentioned range, the granular adhesive agent is preferred because the present adhesive agent is easily produced.

The solid content in the present description refers to the concentration of a component, which is contained in the liquid droplet containing an adhesive composition, other than the solvent and water.

The size of a liquid droplet containing an adhesive composition is preferably greater than or equal to 15 µL and less than or equal to 5 mL. The size thereof is more preferably greater than or equal to 30 µL and further preferably greater than or equal to 50 µL. Moreover, the size thereof is more preferably less than or equal to 3 mL and further preferably less than or equal to 2 mL.

With regard to the method of bringing a liquid droplet containing an adhesive composition into contact with solid particles including fine particles with a number average particle diameter of less than or equal to 500 µm as the main component, liquid droplets containing an adhesive composition may be sprayed onto an aggregate of solid particles by means of a sprayer or the like, and may be dropped onto an aggregate of solid particles.

The whole surface of the liquid droplet containing an adhesive composition needs only to be covered with solid particles, and usually, the whole surface thereof is covered with solid particles by allowing the liquid droplet containing an adhesive composition to be rolled on the solid particles.

The liquid droplet, the whole surface of which is covered with solid particles, containing an adhesive composition may be dried. In the case where a solvent or water is contained in the liquid droplet containing an adhesive composition, it is preferred that the liquid droplet be dried. Drying may be performed before being applied with a stress, and may be performed after being applied with a stress.

In the present description, "drying" means removing water or a solvent from the liquid droplet, which is covered with the solid particles, containing an adhesive composition. The water or the solvent may be completely removed, but may remain at a certain degree of not lowering the adhesive properties of the adhesive agent. Examples of the drying method include a method of allowing the granular adhesive agent to stand at a temperature not causing the chemical and physical properties of the adhesive composition and the solid particles to be changed; a method of exposing the granular adhesive agent to warm air, hot air or low-humidity air; a method of allowing the granular adhesive agent to be dried under vacuum; a method of allowing the granular adhesive agent to be freeze-dried; a method of irradiating the granular adhesive agent with infrared rays, far infrared rays, an electron beam or the like, and the like. The drying temperature is preferably 10 to 200° C. and more preferably 20 to 100° C.

The solid content of the adhesive composition contained in the present adhesive agent after being dried is usually 10 to 100% by mass, preferably 20 to 100% by mass, more preferably 40 to 100% by mass and further preferably 60 to 100% by mass.

The present adhesive agent thus obtained usually has a spherical shape or an oblate sphere-like shape in the atmosphere, and has no adhesive force. With regard to the present adhesive agent, the shell portion collapses by being applied with a stress, and then, the adhesive force is developed by allowing the adhesive composition constituting the core portion to come out to the outside of the shell portion.

FIG. 1 is a schematic view showing a granule of the granular adhesive agent according to the present invention. In the schematic view, w represents the maximum width of a granule of a granular adhesive agent 1, b represents the ground contact width thereof and h represents the height thereof.

The magnitude of the stress applied for allowing the adhesive force to be developed is appropriately selected according to the application of the present adhesive agent. The magnitude of the stress applied for allowing the adhesive force to be developed can be adjusted by selecting the kind, shape and size of the solid particle constituting the shell portion, the viscosity of the adhesive composition, the contact angle of a droplet of the adhesive composition or a liquid droplet containing the adhesive composition on the surface of agglomerated fine particles, the average thickness of the shell portion, and the like.

The stress required for allowing the adhesive force of the present adhesive agent to be developed needs only to be almost comparable to a stress allowing a sufficient amount of the adhesive composition constituting the core portion, which enables the adhesive force to be developed, to come out to the outside of the shell portion, and for example, needs only to be almost comparable to a stress that can be applied when being crushed by fingers of a person. Specifically, the stress is preferably 1 to 1000 kN/m$^2$ and more preferably 5 to 100 kN/m$^2$. When the stress falls within the above-mentioned range, after the granular adhesive agent is coated on an adherend member, the adhesive force can be easily developed by being applied with a stress.

The present adhesive agent can be used for an adhesive for an automobile, an adhesive for a building material, the engagement of the bearing, the fixation of a pipe, the looseness prevention of a screw, the fixation of a gear or a propeller, the assembly of furniture, a fall down prevention member (measures against earthquake), a provisional tacking material for goods on display, an article of stationery, and the like.

The adhesive agent of the present invention can be interposed between adherends to be used. For example, the present adhesive agent is interposed between one adherend member (hereinafter, referred to as an adherend member A) and another adherend member (hereinafter, referred to as an adherend member B), and by allowing the two adherend members to be pressed against each other and applying a stress to the present adhesive agent, the adherend member A and the adherend member B can be bonded together. In this context, the adherend member A and the adherend member B may be the same as or different from each other.

Moreover, the present adhesive agent is interposed between an adherend member A and a release member, and by allowing the adherend member A and the release member to be pressed against each other and applying a stress to the present adhesive agent, an adhesive composition constituting the core portion can be spread out over the surface of the adherend member A. Afterward, the release member can be removed. After a release agent is removed, an adherend member B may be bonded.

It is also possible to obtain a film by spreading out granules of the present adhesive agent on a plane and allowing the present adhesive agent to be applied with a stress. In this context, granules of the present adhesive agent are usually spread out over a plane surface of an adherend member. The stress is usually applied to granules through a release member, after which the release member is removed.

Furthermore, an adherend member B may be bonded onto the film.

It is also possible to form a coating film by allowing the film to be cured. For example, the surface of an adherend member can be covered with a cured product of the adhesive composition.

EXAMPLES

Hereinafter, the present invention will be described with reference to examples. "%" and "part (s)" in examples refer to % by mass and part(s) by mass, respectively, unless otherwise stated.

Example 1

<Preparation of Adhesive Composition>

A mixed solution of 0.05 parts of ammonium peroxide and 5 parts of ion-exchanged water was added to a mixed solution of 45 parts of ion-exchanged water and 5 parts of butyl acrylate (BA). Afterward, the mixture was stirred (stirring rate: 250 rpm) for 24 hours at 65° C. to perform a polymerization reaction. The mixture obtained was allowed to pass through a dialysis membrane (cut-off molecular weight: one hundred thousand) to perform dialysis and was purified to obtain a polybutyl acrylate emulsion (1). The solid content of the polybutyl acrylate emulsion (1) obtained was determined to be 45%, and the volume average particle diameter (Dv) of the dispersoid, which was measured using a laser diffraction type particle size distribution measuring apparatus (product name "Mastersizer2000" available from Malvern Instruments Ltd), was determined to be 250±880 nm. The solid content was measured by a gravimetric method.

<Preparation of Granular Adhesive Agent>

Calcium carbonate particles with a number average particle diameter of 120 nm (hydrophobization-treated particles, available from Shiraishi Kogyo Kaisha, Ltd.) were thinly spread on a petri dish. Onto the calcium carbonate particles, 0.180 parts of the polybutyl acrylate emulsion (1) was dropped. A liquid droplet of the polybutyl acrylate emulsion (1) dropped was rolled for 30 seconds on the calcium carbonate particles to obtain a granular adhesive agent (1) in which the whole outer surface of the liquid droplet of the polybutyl acrylate emulsion was covered with calcium carbonate particles. The granular adhesive agent (1) was dried for 24 hours at 55° C. to remove the solvent, and a granular adhesive agent (2) with an oblate sphere-like shape, in which the whole outer surface of the granule of polybutyl acrylate was covered with calcium carbonate particles, was obtained. Granules of each of the granular adhesive agents (1) and (2) were measured for the size with vernier calipers. As each of the maximum width (w) and the ground contact width (b), an average value of 50 granules of the granular adhesive agent is adopted, and as the height (h), an average value of 3 granules of the granular adhesive agent is adopted.

Granular adhesive agent (1): the maximum width 9.0 mm, the ground contact width 8.2 mm, the height 4.1 mm Granular adhesive agent (2): the maximum width 7.5 mm (standard deviation 0.5 mm), the ground contact width 8.8 mm, the height 3.8 mm The calcium carbonate particles were uniformly spread out with no clearance on a plane, and the contact angle of a liquid droplet of the polybutyl acrylate emulsion (1) thereon was measured using a contact angle meter (product name "SImage 02", available from Excimer Inc.), whereupon the contact angle was determined to be 133°.

With regard to the number average particle diameter of the calcium carbonate particles, the circle equivalent diameter was measured in the following manner using an electron microscope. Images obtained by observing 200 calcium carbonate particles with a transmission electron microscope were analyzed with the product name "Motic Images Plus 2.2s" available from SHIMADZU RIKA CORPORATION to measure the circle equivalent diameter.

In this connection, the calcium carbonate particles had no adhesive force at a temperature of lower than or equal to 80°.

<Evaluation for Adhesivity of Granular Adhesive Agent>

Granules of the granular adhesive agent (2) were wrapped in a sheet of release paper (Release paper glassine type available from LINTEC Corporation) and kneaded by fingers for 30 seconds to be applied with a stress, and an adhesive agent (1) was obtained.

The adhesive agent (1) obtained was evaluated for the adhesive force in the following manner using a probe tack tester (product name "TE-6002", TESTER SANGYO CO., LTD.).

A prescribed amount of the adhesive agent (1) was disposed at the tip of the probe. Moreover, a weight (50 g) with a bobbin-like shape to which a sheet of cover glass was fixed was disposed so that the sheet of cover glass faces the adhesive agent (1). By allowing the weight with a bobbin-like shape, to which the sheet of cover glass was fixed, to fall at a constant rate (10 mm/second), the probe, at the tip of which the adhesive agent (1) was disposed, was allowed to push up the sheet of cover glass, and the adhesive agent (1) disposed at the tip of the probe and the sheet of cover glass were brought into contact with each other at a constant load (50 g) (the contact time: 30 seconds). Afterward, by allowing the weight with a bobbin-like shape, to which the sheet of cover glass was fixed, to rise at a constant rate (10 mm/second), the tackiness agent (1) was separated from the sheet of cover glass. A tack value was calculated from the maximum stress in a stress-displacement curve measured at this time, and energy required for the separation was calculated from the area value of the curved line.

As a result, the tack value and the energy required for the separation were determined to be 7 N and 30 N/mm, respectively.

Granules of the granular adhesive agent (2), which were applied with no stress, were evaluated in the same manner.

As a result, the tack value and the energy required for the separation were determined to be 0 N and 0 N/mm, respectively.

Example 2

A granular adhesive agent (3) with an oblate sphere-like shape was obtained under the same condition as that for Example 1 except that a synthetic resin emulsion (trade name "Mowinyl (registered trademark) 461" available from The Nippon Synthetic Chemical Industry Co., Ltd., the main component: acryl, viscosity 500 to 1500 mpas, the non-volatile component: 64%) containing water as the solvent was used as the emulsion. In the same manner as that for the granular adhesive agent (1), granules of the granular adhesive agent (3) were measured for the size with vernier calipers.

Granular adhesive agent (3): the maximum width 2.5 mm, the ground contact width 0.8 mm, the height 1.4 mm The calcium carbonate particles were uniformly spread out with no clearance on a plane, and the contact angle of a liquid droplet of the "Mowinyl 461" thereon was measured using the contact angle meter, whereupon the contact angle was determined to be 128°.

Granules of the granular adhesive agent (3) were wrapped in a sheet of release paper and kneaded by fingers for 30 seconds to be applied with a stress. With regard to an adhesive agent (2) obtained, the tack value and the energy required for the separation were determined to be 0.26 N and 0.07 N/mm, respectively.

In this connection, as a result of allowing granules of the granular adhesive agent, which were applied with no stress, to be evaluated in the same manner, the tack value and the energy required for the separation were determined to be 0 N and 0 N/mm, respectively.

Example 3

A granular adhesive agent (4) with an oblate sphere-like shape was obtained under the same condition as that for Example 1 except that a synthetic resin emulsion (trade name "Mowinyl (registered trademark) 490" available from The Nippon Synthetic Chemical Industry Co., Ltd., the main component: acryl, viscosity 4000 to 6000 mpas, the concentration of the non-volatile component: 62%) containing water as the solvent was used as the emulsion. In the same manner as that for the granular adhesive agent (1), granules of the granular adhesive agent (4) were measured for the size with vernier calipers.

Granular adhesive agent (4): the maximum width 2.8 mm, the ground contact width 1.0 mm, the height 1.2 mm The calcium carbonate particles were uniformly spread out with no clearance on a plane, and the contact angle of a liquid droplet of the "Mowinyl 490" thereon was measured using the contact angle meter, whereupon the contact angle was determined to be 131°.

Granules of the granular adhesive agent (4) were wrapped in a sheet of release paper and kneaded by fingers for 30 seconds to be applied with a stress. With regard to an adhesive agent (3) obtained, the tack value and the energy required for the separation were determined to be 0.87 N and 0.07 N/mm, respectively.

In this connection, as a result of allowing granules of the granular adhesive agent, which were applied with no stress, to be evaluated in the same manner, the tack value and the energy required for the separation were determined to be 0 N and 0 N/mm, respectively.

These results reveal that the present adhesive agent before being applied with a stress has no adhesive force and the present adhesive agent applied with a stress has an adhesive force. That is, the present adhesive agent is an adhesive agent excellent in handling properties. Moreover, the adhesive force thereof can be controlled so as to fall within a wide range.

INDUSTRIAL APPLICABILITY

The granular adhesive agent according to the present invention is useful since the granular adhesive agent is easy to be handled as compared with a conventional adhesive agent and is excellent in handling properties.

DESCRIPTION OF REFERENCE SIGN

1 Granule of granular adhesive agent

The invention claimed is:

1. A granular adhesive agent comprising a core portion and a shell portion,
    wherein the core portion comprises an adhesive composition and the shell portion is formed from solid particles which comprises hydrophobic fine particles,
    wherein the fine particles are fine particles of an inorganic substance, and
    wherein the maximum width of the granular adhesive agent is greater than or equal to 7.5 mm and less than or equal to 50 mm.

2. The granular adhesive agent according to claim 1, wherein the shell portion is formed from solid particles with a number average particle diameter of less than or equal to 500 μm.

3. The granular adhesive agent according to claim 1, wherein the shell portion is formed from solid particles comprising fine particles with a number average particle diameter of less than or equal to 500 μm as the main component.

4. The granular adhesive agent according to claim 1, wherein the contact angle of a droplet of the adhesive composition or a liquid droplet containing the adhesive composition which are contained in the core portion, on the surface of agglomerated fine particles is greater than or equal to 900.

5. The granular adhesive agent according to claim 1, wherein the fine particles are fine particles having no adhesive force under an atmosphere of 30° C.

6. The granular adhesive agent according to claim 1, wherein the fine particles have a number average particle diameter of greater than or equal to 10 nm and less than or equal to 500 μm.

7. The granular adhesive agent according to claim 4, wherein the volume of the adhesive composition is greater than or equal to 15 μL and less than or equal to 5 mL.

8. The granular adhesive agent according to claim 1, which has been dried.

9. The granular adhesive agent according to claim 1, wherein the adhesive force is developed by being applied with a stress.

10. A method for producing a granular adhesive agent which has the maximum width of the granular adhesive agent greater than or equal to 7.5 mm and less than or equal to 50 mm, comprising the following steps (1) and (2) of;
    (1) bringing a liquid droplet containing an adhesive composition into contact with solid particles which comprise hydrophobic fine particles which are fine particles of an inorganic substance, and
    (2) covering the whole outer surface of the liquid droplet containing an adhesive composition with the solid particles.

11. The method for producing a granular adhesive agent according to claim 10, further comprising the step (3) of;
    (3) drying the liquid droplet containing an adhesive composition which has been covered the whole surface with the solid particles.

12. The method for producing a granular adhesive agent according to claim 10, wherein the solid particles are composed mainly of fine particles with a number average particle diameter of less than or equal to 500 μm.

13. A granular adhesive agent which allows the adhesive force to be developed by being applied with a stress, the granular adhesive agent having solid particles with an outer surface having no adhesive force,
   wherein the solid particles comprise hydrophobic fine particles which are fine particles of an inorganic substance, and
   wherein the granular adhesive agent has the maximum width of the granular adhesive agent greater than or equal to 7.5 mm and less than or equal to 50 mm.

14. The granular adhesive agent according to claim 13, wherein fine particles included in the solid particles have a number average particle diameter of greater than or equal to 10 nm and less than or equal to 500 µm.

15. A film which is formed by spreading out a granular adhesive agent according to claim 1 in a plane and applying a stress to the granular adhesive agent.

16. A coating film which is formed by curing the film according to claim 15.

* * * * *